Aug. 21, 1934.  H. W. CARDWELL ET AL  1,970,840
DOLLY
Filed April 25, 1932
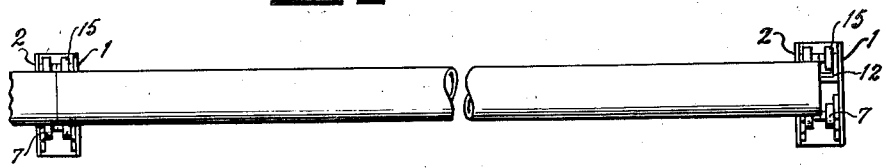
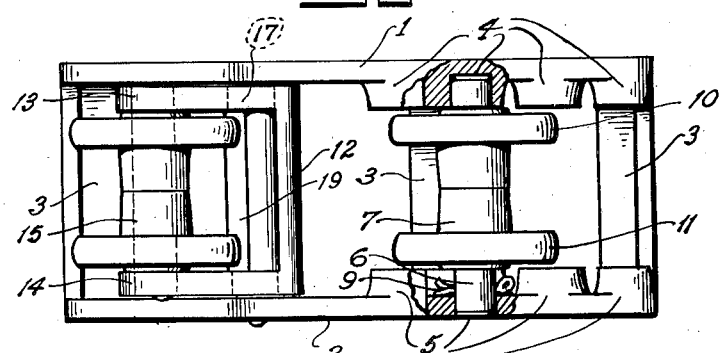
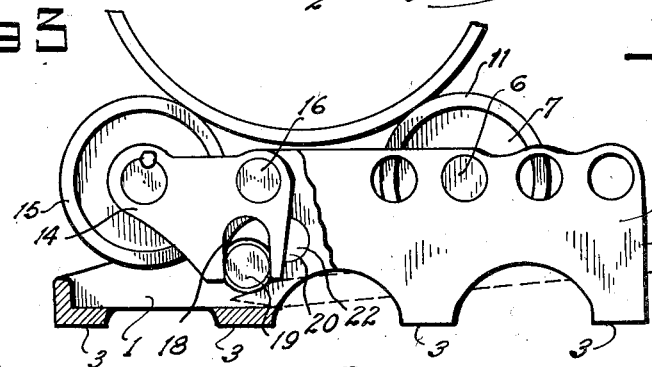
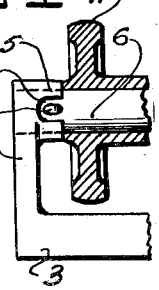
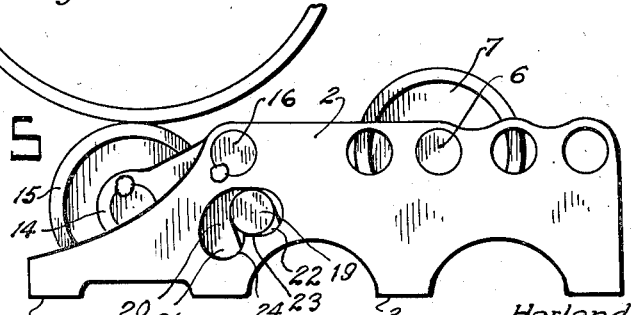
INVENTORS
Harland W. Cardwell.
William C. Guier.
BY
B. F. Frink
ATTORNEY.

Patented Aug. 21, 1934

1,970,840

UNITED STATES PATENT OFFICE 1,970,840

DOLLY

Harland W. Cardwell and William C. Guier, Wichita, Kans.

Application April 25, 1932, Serial No. 607,362

5 Claims. (Cl. 248—30)

This invention relates to dollies, particularly designed to support cylindrical bodies. Primarily, the dollies are intended to support aligning sections of oil or gas line pipe while the ends of the sections are being joined, but the invention is not necessarily limited to any particular use. As now contemplated the dollies will support sections of pipe so that they can have their ends connected and then the pipe is conveniently rolled off the dollies without the necessity of handling the pipe, means being provided for taking care of different sizes of pipes.

The novelty of the invention will be understood by reference to the following description in connection with the accompanying drawing in which:

Fig. 1 is a plan view of two aligning dollies with pipe supported thereby.

Fig. 2 is a plan view of the dolly, parts of bearings being broken away to better illustrate certain other parts.

Fig. 3 is a side elevational view of the dolly parts being broken away to better illustrate certain other parts shown in pipe supporting position.

Fig. 4 is a fragmentary view showing one shaft-bearing, a shaft, a fragmentary section of a pipe supporting roller and an end view of a cotter pin.

Fig. 5 is a side elevational view of the dolly showing the parts in pipe releasing position.

The dolly frame is shown as consisting of two sides 1 and 2 connected together by an appropriate number of cross bars 3. The upstanding side wall 1 has a plurality of spaced recessed bearings 4 and the wall 2 has a plurality of perforated bearings 5 so that the shaft 6 may be passed through the bearings 5, through rollers 7 and into the bearings 4. The bearings 5 are provided with notches 8 so that a cotter pin 9 may be passed through the shaft 6 to hold it in position to support the roller 7. The roller 7 may be a sectional roller or it may be spool-shaped. In either event its peripheral flanges 10 and 11 will project above the tops of the walls 1 and 2. Pivoted to the side walls 1 and 2 is a U-shaped roller carrier and release member 12. The arms 13 and 14 of the member 12 support a roller 15 similar to the roller 7. The carrier is pivoted at its angle, that is at its upper rear corner, to the walls 1 and 2 by the pivot shaft 16. The arms 13 and 14 have at their lower edges, notches 17 and 18 to receive a latching or retaining roller 19 which moves in the right angular slots 20 having vertical portions 21 and horizontal portions 22 intersected by a roller retaining seat 23. When the parts are in position shown in Fig. 3 with the retaining roller in the vertical portions of the slots pressure of the pipe on roller 15 will impart a pressure to the roller 19 to bind it against its seat 24 and thereby prevent its entering the horizontal portion of the slot. Therefore the roller 15 will be held in pipe supporting position by the carrier. When it is desired to release the pipe, a tool such as is shown in dotted lines at 25 is inserted under roller 19 so that the roller can be forced up into the horizontal part 22 of the slot 20 against the seat 23 to allow the roller 15 to drop so that the pipe can roll off the dolly as indicated in Fig. 5.

It will be noted that the shaft 6 for roller 7 can be adjusted longitudinally of the dolly to increase or decrease the space clearance between the rollers 7 and 15 to accommodate different sizes of pipes. Of course it is understood that a number of these dollies will be used at one time, the pipes can be rolled upon or placed upon the dollies and after the ends are fastened together the pipes can easily be released from the dollies as above indicated by operating the detent or member 19 to permit one of the rollers at least to drop below the top edge of the side walls. The device will be rugged of construction and easily operated.

We do not wish to be limited to the particular details of construction shown for obviously changes can be made in form, proportion and design without departing from the spirit of the invention.

What we claim and desire to secure by Letters Patent is:

1. A pipe dolly comprising a frame, a pipe supporting roller carried by the frame, a roller carrier pivoted to the frame, a roller mounted therein, a recessed arm on the carrier, a right-angular slot in the frame and a detent in the recess and the slot.

2. A pipe dolly comprising a frame, a pipe supporting roller carried by the frame, a roller carrier pivoted to the frame, a roller mounted therein, a recessed arm on the carrier, a right-angular slot in the frame and a detent in the recess and the slot, said detent comprising a rolling member.

3. A pipe carrier comprising a substantially rectangular frame, a roller adjustably mounted in the frame, a pivoted roller carrier consisting of a U-shaped member having ends provided with right angular arms, a roller mounted in one arm of each end and a rod projecting through a notch in the other arm of each end and through a right-angular slot in each side of the rectangular frame.

4. A pipe dolly comprising a base frame, a pair of rollers supported thereby, one of said rollers being mounted to be moved from a position extending above the top of said frame to a position below the top thereof, and means for detachably locking said roller in the uppermost position.

5. A pipe dolly comprising a frame, a roller mounted in the frame, a roller carrier pivotally mounted in said frame, a second roller mounted in the carrier, said carrier adapted to swing said roller from a position extending above the top of said frame to a position therebetween and means for releasably locking said carrier in its uppermost position.

HARLAND W. CARDWELL.
WILLIAM C. GUIER.